United States Patent [19]
Elsbett et al.

[11] 3,945,349
[45] Mar. 23, 1976

[54] AIR CONVEYING SYSTEM, ESPECIALLY IN THE INTAKE LINE, FOR SUCCESSIVE CYLINDERS OF RECIPROCABLE PISTON INTERNAL COMBUSTION ENGINES

[76] Inventors: Ludwig Elsbett; Günter Elsbett, both of Industriestrasse 14, D 8543 Hilpoltstein, Germany

[22] Filed: Aug. 30, 1973

[21] Appl. No.: 392,869

[30] Foreign Application Priority Data
Sept. 2, 1972  Germany............................ 2243269

[52] U.S. Cl. ........ 123/30 C; 123/52 M; 123/188 M; 123/52 MC
[51] Int. Cl.² ...................... F02B 75/18; F02B 3/00
[58] Field of Search............ 123/30 C, 52 M, 32 ST, 123/52 MC

[56] References Cited
UNITED STATES PATENTS

| | | | |
|---|---|---|---|
| 2,427,115 | 9/1947 | Barrett............................. | 123/52 M |
| 2,991,057 | 7/1962 | Mays................................. | 123/52 M |
| 3,024,774 | 3/1962 | Eby.................................. | 123/52 M |
| 3,159,148 | 12/1964 | Nallinger et al.................. | 123/52 M |
| 3,270,733 | 9/1966 | Steidler............................. | 123/30 C |
| 3,363,610 | 1/1968 | Massarotti........................ | 123/52 M |
| 3,590,789 | 7/1971 | Wiebicke........................... | 123/30 C |

*Primary Examiner*—Charles J. Myhre
*Assistant Examiner*—Ronald B. Cox
*Attorney, Agent, or Firm*—Walter Becker

[57] ABSTRACT

An air conveying system, especially in the air intake system, for a reciprocable piston internal combustion engine having at least one group of cylinders and valve seats respectively associated therewith which valve seats have an opening toward the cylinders, according to which a plurality of tap lines respectively connected to the cylinders of the group of cylinders lead to the pertaining valve seat openings and communicate with a collecting conduit which is common to all of the tap lines pertaining to one and the same group of cylinders while having at least approximately the same length. Twist forming means are respectively arranged within the range of the valve seat openings for imparting a twist upon the air masses to be passed through the valve seat openings. The cross section of the tap lines and of the respective common collecting conduit pertaining thereto increase gradually in a steady manner from the pertaining valve seat openings in the direction away therefrom. The distance between the respective valve seat openings and the remote end of the pertaining common collecting conduit is at least approximately the same.

2 Claims, 2 Drawing Figures

U.S. Patent  March 23, 1976  3,945,349
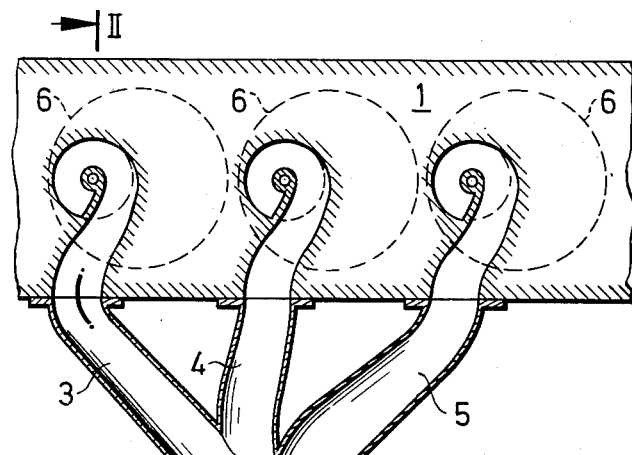
Fig.1
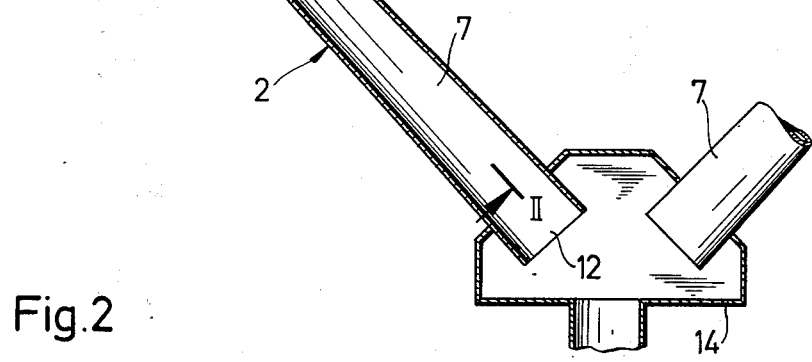
Fig.2
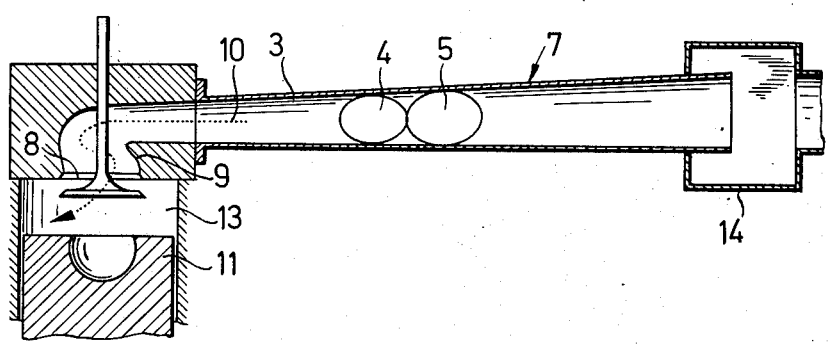

AIR CONVEYING SYSTEM, ESPECIALLY IN THE INTAKE LINE, FOR SUCCESSIVE CYLINDERS OF RECIPROCABLE PISTON INTERNAL COMBUSTION ENGINES

The present invention relates to an air feeding system, particularly in the intake system for successive cylinders of reciprocable piston internal combustion engines, with at least one tap line leading to a collecting line for some cylinders combined to a group. Each tap line is arranged between the collecting line and a cylinder pertaining thereto, and the tap lines have the same or approximately the same length and within the range of the respective valve seat opening toward the cylinder comprise twist forming elements for the air masses to be passed therethrough.

For purposes of increasing the output of an internal combustion engine, such as diesel engine, it is necessary in addition to taking a number of steps, also to pay particular attention to the air supply system, especially in the intake system, in order in this way so to introduce the quantity of air to be employed for the combustion process into the combustion chamber that an optimum intermixing of the combustion air with the available fuel can be effected while, on the other hand, the relationship of the quantity of fuel to air is so selected that as much air will be burned as fuel will be available to the air. In order in this connection to adapt the quantity of air to be placed at the disposal to the corresponding quantity of fuel, it is known, especially in the intake system of an internal combustion engine, to provide charging means in order by means thereof to increase the delivery of the air to be passed through the intake conduit. These charging means may consist of fan wheels, turbochargers or guiding devices taking advantage of the driving wind.

According to a heretofore known internal combustion engine with an air supplying system in the intake for supplying an increased quantity of air, the individual cylinders and combustion chambers of the internal combustion engine are by short connecting conduits, so-called tap conduits, connected to a common connecting conduit having a plurality of cylinders associated therewith. These tap conduits have different lengths and are connected to the collecting conduit through a likewise common connecting piece or short feed pipe. The common collecting conduit is of a conical design and has their smaller opening at the connecting piece of the tap conduits and has its greater opening at that end which faces toward the fan wheel. The fan wheel, which is driven by the internal combustion engine itself, rotates in front of the large opening of the collecting conduit, said fan wheel being arranged between the internal combustion engine and a cooler preceding same. The space between the cooler and the internal combustion engine in which the fan wheel rotates is free from surrounding elements. There is provided a connecting member of the cooler through which cooled driving wind is passed. This connecting member is arranged in front of the large opening of the collecting conduit so that also a portion of the driving wind passes therethrough into the connecting line. With this internal combustion engine there is provided a conical connecting conduit which would be able to store a greater quantity of air in a smaller axial chamber; there should be noted that this quantity of air, in conformity with the cycle sequence with all intake cycles cannot be drawn fast enough into the combustion chamber. The foregoing is so because in the flow sequence there would exist technically unfavorable arrangement and design of the tap conduits. Thus a considerable portion of the kinetic energy of the suction stroke of the piston is lost. As a result thereof, the combustion chamber is not filled with fresh air to the optimum extent so that with insufficient fresh air available, the fuel frequently burns to soot, or with an excess of fresh air at the combustion area, sufficient oxygen especially for $NO_x$ reactions will be available so that in both instances a worsening of the waste gases is to be expected.

It is, therefore, an object of the present invention to provide an air feeding system, especially in the intake, of a reciprocable piston internal combustion engine, by means of which in all speed ranges, still prior to the completion of the intake stroke, the optimum cylinder filling will be realized by a high acceleration of the quantity of air in the air supply system.

This object and other objects and advantages of the invention will appear more clearly from the following specification in connection with the accompanying drawing, in which:

FIG. 1 is a top view of an internal combustion engine with tap conduits connected to the cylinders thereof and with a collecting conduit connected to said tap conduits for some successive cylinders.

FIG. 2 represents a cross section through a tap line and the collecting line connected thereto with a valve seat opening provided on the cylinder head.

The air supply system is provided according to the invention for successive cylinders of reciprocable piston internal combustion engines. Each cylinder has associated therewith at least one tap line leading to a collecting line for some cylinders combined in a group. Each tap line is arranged between the collecting line and an associated cylinder. The tap lines have at least the same length and within the range of the respective valve seat opening toward the cylinder comprise twist forming elements for the air masses to be passed therethrough. The foregoing is characterized primarily in the cross section of each air supply system. The latter comprises tap lines and one collecting line common to a plurality of cylinders. The cross section from the valve seat opening on gradually widens. The distance between the valve seat opening and the end of the air supply system is at least approximately the same for each cylinder.

In view of these features, it will be realized that the delivery rate of fresh air for each combustion chamber will be assured in a simple manner as far as an optimum combustion is concerned so that the combustion can take place with less harmful waste gas. In view of the conical design of the air supply system from the valve seat opening to the inlet opening of the system, the inflow velocity of the air column is increased because the air which is farther away from the valve seat opening will not be accelerated so high. Due to the high inflow velocity, it will be realized that the cylinder, will be filled prior to the completion of the intake stroke of the piston the foregoing is in contrast to the vibration charge-up. Such situation in turn is of foremost importance for the twisting arrangement in the cylinder. Furthermore, in view of the good filling of the cylinder and the proper mixing operation, a better combustion will be obtained; this in turn permits an increase in the output with low quantities of harmful waste gas. Furthermore, it was found that the oscillation of the air column frequently follows an effected acceleration. Such oscillation is without importance however for the filling of the cylinder or combustion chamber. An optimum acceleration of the air column in front of the cylinder or combustion chamber may be realized particularly when the inlet valve is opened only after the residual gas pressure in the cylinder or combustion chamber has been reduced in view of the pressure of the air column in the air supply system. Moreover, the underpressure generated by the piston can in the form of acceleration energy be conveyed completely to the air column in the air supply system because no passage restriction exists which could use up the energy of the intake stroke.

It has furthermore been ascertained that the time period during which the underpressure acts through the intake stroke of the piston upon the acceleration of the air column in the air supply system, in this instance in the intake system, decreases with the increase in the distance from the inlet valve which fact is due to the finite sound velocity. It will follow from this fact that the maximum possible acceleration of the air column to a high speed is possible only in the vicinity of the valve which means in the vicinity of the valve opening.

In order to take this finding into consideration in the entire air supply system, it has been suggested according to a further development of the invention to increase the cross section of the air supply system, i. e. of the tap lines and the common collecting line, at the second power of the increasing distance from the valve opening to the extent to which the timewise influence of the underpressure, i. e. the underpressure wave of the piston, decreases with increasing distance from the valve seat opening. In this way, the cross section of the intake conduit is at that end which faces toward the valve seat opening kept smaller than at that end which faces away from the valve seat opening for instance at the compensating container. Regardless of this fact, the pipe length from the valve seat opening to the large opening of the collecting conduit must for each cylinder be of the same length in order to assure the same conditions for the respective intake stroke.

While a reciprocable piston internal combustion engine has been known which has an inlet passage in the cylinder head with which the inlet passage widens itself in a continuous manner from a restriction provided within the region of the valve seat opening, toward the inlet as well as toward the valve seat opening, it is to be noted that the inlet passage or the air supply system with this internal combustion engine does not increase in its cross section from the valve seat opening to the final inlet opening, but instead comprises a restriction by which the underpressure of the piston on its intake stroke, which underpressure is generated as acceleration energy for the air column, cannot fully act upon said air column.

In addition thereto, it is known to increase the delivery rate in combustion air of internal combustion engines by taking advantage of the oscillation of the air column in the air supply system. This air column, which at a certain amplitude oscillates back and forth, passes through the opening of the inlet valve aided by the suction force of the piston into the cylinder. Regardless of the fact that with different speeds it is not simple to obtain uniform delivery rates with each intake stroke, it is necessary with systems of this type, in order to have available sufficient quantities of air in front of the inlet valves, to make the suction conduits rather long.

Referring now to the drawing in detail, the reciprocable piston internal combustion engine 1 illustrated therein has connected thereto an air supply system 2 which comprises a plurality of tap lines 3–5 and also comprises a common collecting line 7 which is intended for a plurality of successive cylinders 6. The tap lines 3–5 which form the connection between cylinder 6 and collecting line 7 are together with the collecting line of the same length or approximately the same length counting from the valve seat opening 8 to the inlet opening 12 and are at their end which faces toward the respective valve opening 8 equipped preferably with twist forming inlet members 9 for the combustion air 10 passing into the cylinder chamber 13. In order to realize a high rate of delivery even when the speed of the internal combustion engine 1 varies, the cross section of the tap lines 3–5 and the cross section of the common collecting line 7 communicating with the tap lines is gradually widened from the valve seat opening 8 on, and more specifically, in such a way that this distance which increases with the second power of the increasing distance increases from the valve seat opening to the extent to which the timewise influence of the underpressure of the piston 11 carrying out a suction stroke decreases with increasing distance from the valve seat opening.

In view of the numerous tests, it has been found that the cross sectional increase is to occur from the valve seat opening 8 to the inlet opening 12 of the air supply system 2; for instance this cross sectional increase of the air supply system occurs in the intake system at the rate of 1:2. This rate means that the cross section at the valve seat opening 8 is about half as great as that at the inlet opening 12. The inlet opening 12 of the collecting line 7 may lead into a container 14 combining a plurality of collecting conduits or may itself serve as intake.

It is, of course, to be understood that the present invention is, by no means, limited to the specific showing in the drawing but also comprises any modifications within the scope of the appended claims.

What we claim is:

1. An air intake system for a reciprocable piston internal combustion engine having at least one group of cylinders with valve seats opening into the respective cylinders, said system including a conduit having an air inlet end, a plurality of tap lines opening from the other end and connected to the cylinders of said group and opening into the respective valve seat openings, the end of each tap line opening into said conduit having a diameter substantially equal to the diameter of the conduit at that end, each of said tap lines having a curved end connecting to its respective valve seat opening as a twist forming means arranged adjacent the respective valve seat opening for imparting a twist to the air passing through said valve seat opening, the cross section of said conduit and the said tap lines opening therefrom decreasing gradually in a continuous manner from the inlet end of said conduit to the opening for each tap line and continuing such gradually decreasing area to the respective valve seat opening of each tap line, the distance from the inlet end of said conduit to the end of each tap line opening into its respective valve seat opening being substantially equal, so that on each inlet stroke of each piston, the same volume of air is delivered to the cylinder and the decreasing area of said conduit and each tap line increases the velocity of the air passing from said inlet end of said conduit to said twist forming means and the respective valve opening.

2. An air intake system as claimed in claim 1, in which the cross section of each tap line and the common conduit decreases as the square of the distance from the remote inlet end of the conduit to the valve seat opening of the tap line.

* * * * *